Aug. 13, 1929.                    C. MOXLEY                    1,724,676
                              HEAT EXCHANGE ROLL
                              Filed March 1, 1928
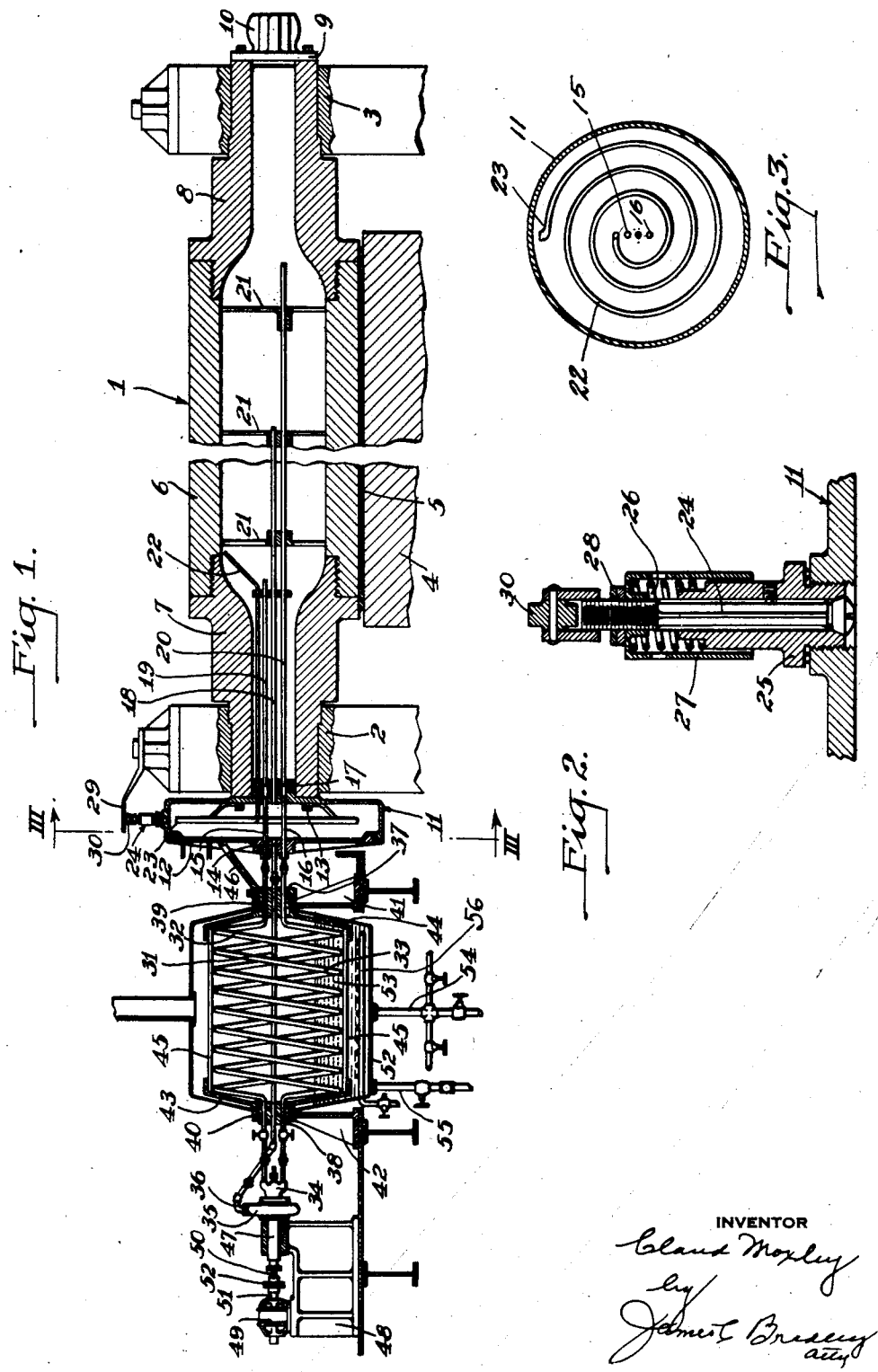

Patented Aug. 13, 1929.

1,724,676

UNITED STATES PATENT OFFICE.

CLAUD MOXLEY, OF FORD CITY, PENNSYLVANIA, ASSIGNOR TO PITTSBURGH PLATE GLASS COMPANY, A CORPORATION OF PENNSYLVANIA.

HEAT-EXCHANGE ROLL.

Application filed March 1, 1928. Serial No. 258,265.

The invention relates to rolls and particularly to fluid cooled rolls for use in the making of plate glass, although the rolls may be used for other purposes. It has for its principal objects, the provision of a roll construction having improved means for circulating fluid therethrough and maintaining it at a uniform temperature. One embodiment of the invention is illustrated in the accompanying drawings, wherein:

Figure 1 is a vertical section through a roll equipped with the improved construction. Fig. 2 is an enlarged section through a relief valve on the expansion chamber taken in a plane at right angles to that of Fig. 1. And Fig. 3 is a section on the line III—III of Fig. 1.

The roll 1 is shown as supported in a pair of bearings 2, 3 above the roll table 4 with a sheet of glass 5 between the roll and roll table, this being one of a large number of ways in which the roll may be used. The roll, as shown, is made in three parts, the center part 6 and the end parts 7 and 8. The part 8 is provided with a closure plate 9 having an end 10 integral therewith, to which a connection is made with a tumbler shaft in order to give the roll its movement of rotation.

Clamped to the outer end of the other end member 7 is an expansion chamber 11, having the cover plate 12, such chamber being secured in position by means of the stud bolts 13 which extend through the walls of the chamber and into the end of the member 7. Extending transversely of the chamber are three pipe connections 14, 15 and 16 with their inner ends in opposition to three openings through a header 17, which is secured rigidly in the end of the member 7. This header 17 carries the three pipes 18, 19 and 20, which are in alignment with and communicate with the pipes 14, 15 and 16, the center pipe 18 terminating at the center of the roll cavity, while the other two pipes 19 and 20 terminate adjacent the ends of the roll cavity, the pipes being supported from the walls of the roll cavity by means of suitable spiders 21. A fourth pipe 22 leads from a point adjacent the outer periphery of the roll cavity through the header 17 and into the expansion chamber 11. This pipe, after it enters the chamber 11 is formed in the shape of a spiral, which terminates at 23 adjacent the periphery of the expansion chamber. The purpose of this latter pipe is to siphon away any gases which collect in the roll cavity, such gases after being discharged into the chamber 11 being liberated thereby through the relief valve 24 shown in Fig. 2. This relief valve is mounted for vertical sliding movement in the plug 25 and is held closed by the spring 26, which presses upward upon the casing 27. The casing 27 in turn is held in adjusted position on the valve stem by means of the nuts 28. The valve is opened from time to time to permit the escape of accumulated gases by means of a cam member 29 carried upon the roll housing. The valve stem 24 carries at its end a roller 30 and upon each revolution of the roll and chamber 11, this roll is engaged by the cam 29 forcing the valve downward and opening it, the valve being closed by the spring 26 after the roll 30 moves from beneath the cam member.

Connected to the outer ends of the three pipe connections 14, 15 and 16 are the pipe connections 31, 32 and 33. The pipes 32 and 33 are formed into coils and discharge at their left hand ends into the two-way connection 34 which constitutes the inlet of the rotary pump 35. The third pipe 31 is connected to the outlet of the pump 35 at the point 36. The three pipes extend through a pair of circular sleeves 37 and 38 adjacent the ends of the coils and these sleeves are mounted for rotation in the bearings 39 and 40 carried by the fixed standards 41 and 42. The sleeves 38 and 39 are extended laterally at their inner ends in the form of discs 43 and 44 connected by the transverse bars 45, thus providing an open-work casing carrying the coils 32 and 33. In this manner, the coils and pump are mounted to rotate with the roll and in order to relieve the pipe connections of the strain of rotating the coils and pump, a bracket 46 is employed, extending from the sleeve 37 to the cover plate 12 of the expansion chamber.

The casing of the pump 35 is extended to the left in the form of a trunnion 47, which is journalled in the stand 48 and this stand carries an electric motor 49 for driving the pump rotor. The shaft 50 of the rotor is directly connected to the motor shaft 51 by means of the coupling 52.

In order to supply a cooling means for the coils 32 and 33, the tank 52 is provided in which the lower portions of the coils extend. This tank is partially filled with the liquid 53 which may be kept at any desired temperature by means of a circulation through the pipes 54 and 55, one of which is an inlet pipe and the other an outlet pipe. In operation, the cooling liquid is circulated by the pump 35 through the pipe 31 to the pipe 18, which is arranged axially of the roll, such pipe discharging into the roll at the center thereof. The fluid which is thus supplied to the middle of the roll is withdrawn at its two ends through the pipes 19 and 20, which pipes lead back to the coils 32 and 33, discharging at their left hand ends into the inlet connections 34 of the pump. As the liquid circulates through the coils 32 and 33, it is cooled to any desired degree, depending upon the amount of cooling liquid circulated through the tank 52. Various liquids may be employed as the temperature regulating medium, water being employed if the temperatures are relatively low, while oil may be employed if such temperatures are relatively high. The invention is equally applicable where it is desired to utilize the circulating fluid to heat the roll rather than to cool it, and in such case suitable heating means may be supplied in the tank 52, or burners may be provided which play upon the coils 32 and 33. The expansion chamber 12 not only takes care of the gases which it is desired to eliminate from the system, but also provides a safety device which will give under the pressures induced incident to the expansion of the liquid in the system. Any other suitable safety devices may also be applied to the system for relieving excess pressure.

The removal of the gases which collect in the roll by means of the vent pipe 22 is desirable, as pockets of gas in the roll keep the liquid out of contact with the metal and reduce the cooling effect of the liquid and prevent such effect from being uniformly applied. The spiral form of the vent pipe in the chamber 11 causes it to act as a pumping means as the parts rotate, thus making the withdrawal of the gas from the roll more effective. If the gases removed are combustible due to using oil as a cooling or heating fluid, the valve device shown in Fig. 2 is not employed as the gases might ignite from the hot glass. The body of gas which collects in the chamber 11 acts as a relief means for preventing undue pressure from accumulating in the system. When the casting operation is discontinued for any considerable time, it becomes desirable to prevent the roll from cooling down, and at such time, the liquid in the chamber 52 is withdrawn and the gas burner 56 is utilized to heat the liquid circulating through the coils thereabove.

What I claim is:

1. In combination, a hollow roll mounted for rotation, a circulating coil and a rotary pump mounted to rotate with the roll with said coil in communication with the interior of the roll, and means for driving the pump to circulate a fluid through the coil and the roll.

2. In combination, a hollow roll mounted for rotation, a circulating coil and a rotary pump mounted to rotate with the roll with said coil in communication with the interior of the roll, temperature modifying means located so as to act upon said coil as it rotates, and means for driving the pump to circulate a fluid through the coil and the roll.

3. In combination, a hollow roll mounted for rotation, a circulating coil and a rotary pump mounted to rotate with the roll with said coil in communication with the interior of the roll, a cooling bath with which said coil contacts as it rotates, and means for driving the pump to circulate a fluid through the coil and the roll.

4. In combination, a hollow roll mounted for rotation, a circulating coil and a rotary pump mounted to rotate with the roll with said coil in communication with the interior of the roll, and with the axis of rotation of the pump rotor in alinement with the axis of rotation of the roll, and a motor for driving the pump rotor to circulate fluid through the coil and the roll.

5. In combination, a hollow roll mounted for rotation, a circulating coil and a rotary pump mounted to rotate with the roll with said coil in communication with the interior of the roll, an expansion chamber also mounted to rotate with the roll and in communication with the interior of the roll, and means for driving the pump to circulate a fluid through the coil and roll.

6. In combination, a hollow roll mounted for rotation, a circulating coil and a rotary pump mounted to rotate with the roll with said coil in communication with the interior of the roll, an expansion chamber also mounted to rotate with the roll and in communication with the interior of the roll, a vent pipe leading from the peripheral portion of the roll cavity to the expansion chamber, a relief outlet carried by the expansion chamber, means for opening said outlet at intervals and means driving the pump to circulate a fluid through the coil and the roll.

7. In combination, a hollow roll mounted for rotation, a circulating coil and a rotary pump mounted to rotate with the roll with said coil in communication with the interior of the roll, an expansion chamber also mounted to rotate with the roll and in communication with the interior of the roll, a vent pipe leading from the peripheral portion of the roll cavity to the expansion chamber, a relief outlet carried by the expansion chamber, means for opening said outlet at intervals and means driving the pump to circulate a fluid through the coil and the roll, said vent pipe being arranged in the expansion chamber in the form of a spiral leading from the center thereof to the periphery.

8. In combination, a hollow roll mounted for rotation, a circulating coil and a rotary pump mounted to rotate with the roll with said coil in communication with the interior of the roll, an expansion chamber also mounted to rotate with the roll and in communication with the interior of the roll, a vent pipe leading from the peripheral portion of the roll cavity to the expansion chamber, a relief outlet carried by the expansion chamber, means operated by the rotation of the roll for opening said outlet at intervals, and means for driving the pump to circulate a fluid through the coil and the roll.

In testimony whereof, I have hereunto subscribed my name this 11th day of February, 1928.

CLAUD MOXLEY.